US006864918B2

(12) United States Patent
Koide

(10) Patent No.: US 6,864,918 B2
(45) Date of Patent: Mar. 8, 2005

(54) IMAGE PICKUP APPARATUS, METHOD OF CONTROLLING THE IMAGE PICKUP APPARATUS, AND EXTERNAL DEVICE

(75) Inventor: Yuji Koide, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 09/976,095

(22) Filed: Oct. 15, 2001

(65) Prior Publication Data

US 2002/0051064 A1 May 2, 2002

(30) Foreign Application Priority Data

Oct. 19, 2000 (JP) ....................................... 2000-319897

(51) Int. Cl.[7] ................................................. H04N 5/76

(52) U.S. Cl. ............................. 348/231.1; 348/231.99; 348/207.1

(58) Field of Search ......................... 348/231.99, 231.1, 348/231.2, 231.6, 231.7, 231.8, 231.9, 552, 143, 211.1, 211.13; 709/219

(56) References Cited

U.S. PATENT DOCUMENTS 5,689,442 A * 11/1997 Swanson et al. ............ 380/241
6,208,379 B1 * 3/2001 Oya et al. .................... 348/143
6,300,976 B1 * 10/2001 Fukuoka ................ 348/231.99
6,393,470 B1 * 5/2002 Kanevsky et al. .......... 709/219
6,414,716 B1 * 7/2002 Kawai ...................... 348/211.3
6,456,321 B1 * 9/2002 Ito et al. ...................... 348/143
6,701,058 B1 * 3/2004 Tsubaki ................... 348/207.1
2002/0089592 A1 * 7/2002 Hashimoto et al. ......... 348/211
2002/0191089 A1 * 12/2002 Ikeda ...................... 348/231.7
2003/0112337 A1 * 6/2003 Sato et al. ............... 348/231.2

FOREIGN PATENT DOCUMENTS

JP 2000-134531 5/2000

* cited by examiner

*Primary Examiner*—Aung Moe
(74) *Attorney, Agent, or Firm*—Fitzpatrick, Cella, Harper & Scinto

(57) ABSTRACT

An image pickup apparatus, an external device and an image pickup method enabling provision of an open area in an image memory by performing automatic transfer operation of a digital image signal without requiring a user to cancel a photography preparation instruction or a picture taking instruction are provided. A digital camera or the image pickup apparatus is arranged to transfer to a computer a digital image signal accumulated in a RAM when the digital camera is in a photography preparation state or in a photography execution state, when an image already saved to a storage medium exists in the RAM, and when the RAM is full and a new digital image signal cannot be accumulated.

17 Claims, 10 Drawing Sheets

FIG. 3

| PC REQUEST | PARAMETER | MEANING OF PC REQUEST |
|---|---|---|
| REQUEST_INIT | NOTHING | INITIALIZATION OF DIGITAL IMAGE SIGNAL TRANSFER FACILITY |
| REQUEST_EXIT | NOTHING | END OF DIGITAL IMAGE SIGNAL TRANSFER FACILITY |
| REQUEST_IMAGE_SIZE | IMAGE INDEX | REQUIRE FILE SIZE OF DIGITAL IMAGE SIGNAL PHOTOED WITH IMAGE PICKUP EQUIPMENT. DESIGNATE IMAGE BY IMAGE INDX SIMULTANEOUSLY NOTIFIED BY CAMERA EVENT EVENT_IMAGE_CAPTURED AT THIS TIME. |
| REQUEST_TRANSFER_IMAGE | IMAGE INDEX | REQUIRE TO TRANSMIT DIGITAL IMAGE SIGNAL PHOTOED WITH IMAGE PICKUP EQUIPMENT TO COMPUTER. DESIGNATE IMAGE TO BE TRANSMITTTED BY IMAGE INDX SIMULTANEOUSLY NOTIFIED BY CAMERA EVENT EVENT_IMAGE_CAPTURED AT THIS TIME. |
| REQUEST_CLEAR_IMAGE | IMAGE INDEX | REQUIRE THAT DIGITAL IMAGE SIGNAL WHICH TRANSFER ENDED SHOULD BE DELETED FROM IMAGE MEMORY. DESIGNATE IMAGE TO BE DELETED BY IMAGE INDX SIMULTANEOUSLY NOTIFIED BY CAMERA EVENT EVENT_IMAGE_CAPTURED AT THIS TIME. |

FIG. 4

| CAMERA EVENT | PARAMETER | MEANING OF CAMERA EVENT |
|---|---|---|
| EVENT_IMAGE CAPTURED | IMAGE INDEX | NOTIFY FROM IMAGE PICKUP EQUIPMENT TO COMPUTER THAT NEW DIGITAL IMAGE SIGNAL WAS CREATED BY PHOTOGRAPHY WITH IMAGE PICKUP EQUIPMENT. NOTIFY SIMULTANEOUSLY IMAGE INDEX FOR DISCRIMINATING PHOTOED DIGITAL IMAGE SIGNAL ON IMAGE MEMORY AT THIS TIME. |
| EVENT_TRANSFER_ ENABLE | NOTHING | NOTIFY FROM IMAGE PICKUP EQUIPMENT TO COMPUTER THAT IT IS IN STATE WHICH CAN BE TRANSMITTED. |
| EVENT_TRANSFER_DISABLE | NOTHING | NOTIFY FROM IMAGE PICKUP EQUIPMENT TO COMPUTER THAT IT IS IN TRANSFER IMPOSSIBLE STATE. |

FIG. 6

| | UNDER PHOTOGRAPHY PREPARATION OR PHOTOGRAPHY EXECUTION (OUTPUT RESULT OF PHOTOGRAPHY PREPARATION STATE JUDGMENT UNIT 13 OR PHOTOGRAPHY RUNNING STATE JUDGMENT UNIT 14) | IMAGE ALREADY STORED ON STORAGE MEDIUM 123 IS ON RAM121 (OUTPUT RESULT OF IMAGE SIGNAL RECORD STATE JUDGMENT UNIT 15) | RAM121 FULL (OUTPUT RESULT OF IMAGE MEMORY ACCUMULATION STATE JUDGMENT UNIT 16) | IMAGE TRANSFER PROPRIETY STATE (CAM_TR_STATE) (OUTPUT RESULT OF IMAGE TRANSFER PROPRIETY JUDGMENT UNIT 17) |
|---|---|---|---|---|
| (1) | NO | NO | NO | FALSE |
| (2) | NO | NO | YES | FALSE |
| (3) | NO | YES | NO | TRUE |
| (4) | NO | YES | YES | TRUE |
| (5) | YES | NO | NO | FALSE |
| (6) | YES | NO | YES | FALSE |
| (7) | YES | YES | NO | FALSE |
| (8) | YES | YES | YES | TRUE |

FIG. 11

| | UNDER PHOTOGRAPHY PREPARATION OR PHOTOGRAPHY EXECUTION (OUTPUT RESULT OF PHOTOGRAPHY PREPARATION STATE JUDGMENT UNIT 13 OR PHOTOGRAPHY RUNNING STATE JUDGMENT UNIT 14) | ALL IMAGES ON RAM121 HAS BEEN ALREADY STORED ON STORAGE MEDIUM 123 (OUTPUT RESULT OF IMAGE SIGNAL RECORD STATE JUDGMENT UNIT 15) | RAM121 FULL (OUTPUT RESULT OF IMAGE MEMORY ACCUMULATION STATE JUDGMENT UNIT 16) | IMAGE TRANSFER PROPRIETY STATE (CAM_TR_STATE) (OUTPUT RESULT OF IMAGE TRANSFER PROPRIETY JUDGMENT UNIT 17) |
|---|---|---|---|---|
| (1) | NO | NO | NO | FALSE |
| (2) | NO | NO | YES | FALSE |
| (3) | NO | YES | NO | TRUE |
| (4) | NO | YES | YES | TRUE |
| (5) | YES | NO | NO | FALSE |
| (6) | YES | NO | YES | FALSE |
| (7) | YES | YES | NO | FALSE |
| (8) | YES | YES | YES | TRUE |

IMAGE PICKUP APPARATUS, METHOD OF CONTROLLING THE IMAGE PICKUP APPARATUS, AND EXTERNAL DEVICE

BACKGROUND OF THE INVENTION

1. Field of the Invention

The present invention relates to an image pickup apparatus which records a digital image signal by photographing an object, and which transfers the recorded digital image signal to an external device. The present invention also relates to the external device connected to the image pickup apparatus, and to an image pickup method.

2. Related Background Art

Conventionally, in an image pickup system including an image pickup apparatus such as a digital camera and an external device connected to the image pickup apparatus through a communication means of the image pickup apparatus, a picture taking operation is performed with priority by interrupting transfer of a digital image signal representing a photographed image to the external device when a photography preparation instruction is given by a user during transfer of the image signal (Japanese Patent Application Laid-open No. 2000-134531).

In the conventional image pickup system, however, when a picture taking operation producing a digital image signal and transfer of the produced digital image signal are performed simultaneously with each other, there is a possibility that the amount of data of the digital image signal produced by picture taking exceeding that of the transferred digital image signal, because the picture taking operation is performed with priority over the transfer operation. In such a case, the image memory for temporarily storing the digital image signal produced by picture taking, which is provided to the image pickup system, is filled to capacity, and the image pickup apparatus becomes unable to perform a new picture taking operation. To newly start picture taking, the user must restart the transfer operation by canceling the photography preparation instruction or a picture taking instruction to provide an open area in the image memory necessary for the next picture taking.

SUMMARY OF THE INVENTION

The present invention aims to solve at least one of the above-described problems.

An object of the present invention is to provide an image pickup apparatus capable of automatically performing an operation for transferring a digital image signal to open an area in an image memory without requiring cancellation of a photography preparation instruction or a picture taking image pickup instruction from a user.

Another object of the present invention is to provide an image pickup apparatus capable of preventing occurrence of loss of a digital image signal, or the like even when communication failure occurs during image transfer.

To achieve these objects, according to the present invention, there is provided an image pickup apparatus which records a digital image signal by taking a picture of an object and which transfers the recorded digital image signal to an external device, the apparatus comprising a buffer memory for temporarily accumulating the digital image signal obtained by picture taking, an image saving memory for saving the digital image signal, digital image signal record state judgment means for making a judgment as to whether the digital image signal obtained by picture taking has been recorded in the image saving memory, image memory accumulation state judgment means for making a judgment as to whether a new digital image signal can be accumulated in the buffer memory, and transfer means for transferring to the external device the digital image signal accumulated in the buffer memory and corresponding to the digital image signal recorded in the image saving memory if the digital image signal record state judgment means determines that the digital image signal obtained by picture taking has been recorded in the image saving memory, and if the image memory accumulation state judgment means determines that any new digital image signal cannot be accumulated in the buffer memory.

Further, the buffer memory is controlled so that the accumulated digital image signal is erased or can be overwritten after transfer of the digital image signal by the transfer means.

These and other objects and features of the present invention will become apparent from the following detailed description of embodiments of the invention in conjunction with the accompanying drawings.

BRIEF DESCRIPTION OF THE DRAWINGS

FIG. 3 is a diagram showing kinds of request transmitted from the computer 200 to a digital camera 100 and the meanings of the kinds of request;

FIG. 4 is a diagram showing kinds of camera event transmitted from the digital camera 100 to the computer 200 and the meanings of the kinds of camera event;

FIG. 6 is a diagram showing results of judgments made by an image transfer propriety judgment unit 17 with respect to output information from a photography preparation state judgment unit 13, a photography running state judgment unit 14, a digital image signal record state judgment unit 15, and an image memory accumulation state judgment unit 16;

FIG. 11 a diagram showing results of judgments made by the image transfer propriety judgment unit 17 with respect to output information from the photography preparation state judgment unit 13, the photography running state judgment unit 14, the digital image signal record state judgment unit 15, and the image memory accumulation state judgment unit 16.

DETAILED DESCRIPTION OF THE PREFERRED EMBODIMENTS

Embodiments of the present invention will be described below in detail with reference to the accompanying drawings.

Figure 1:
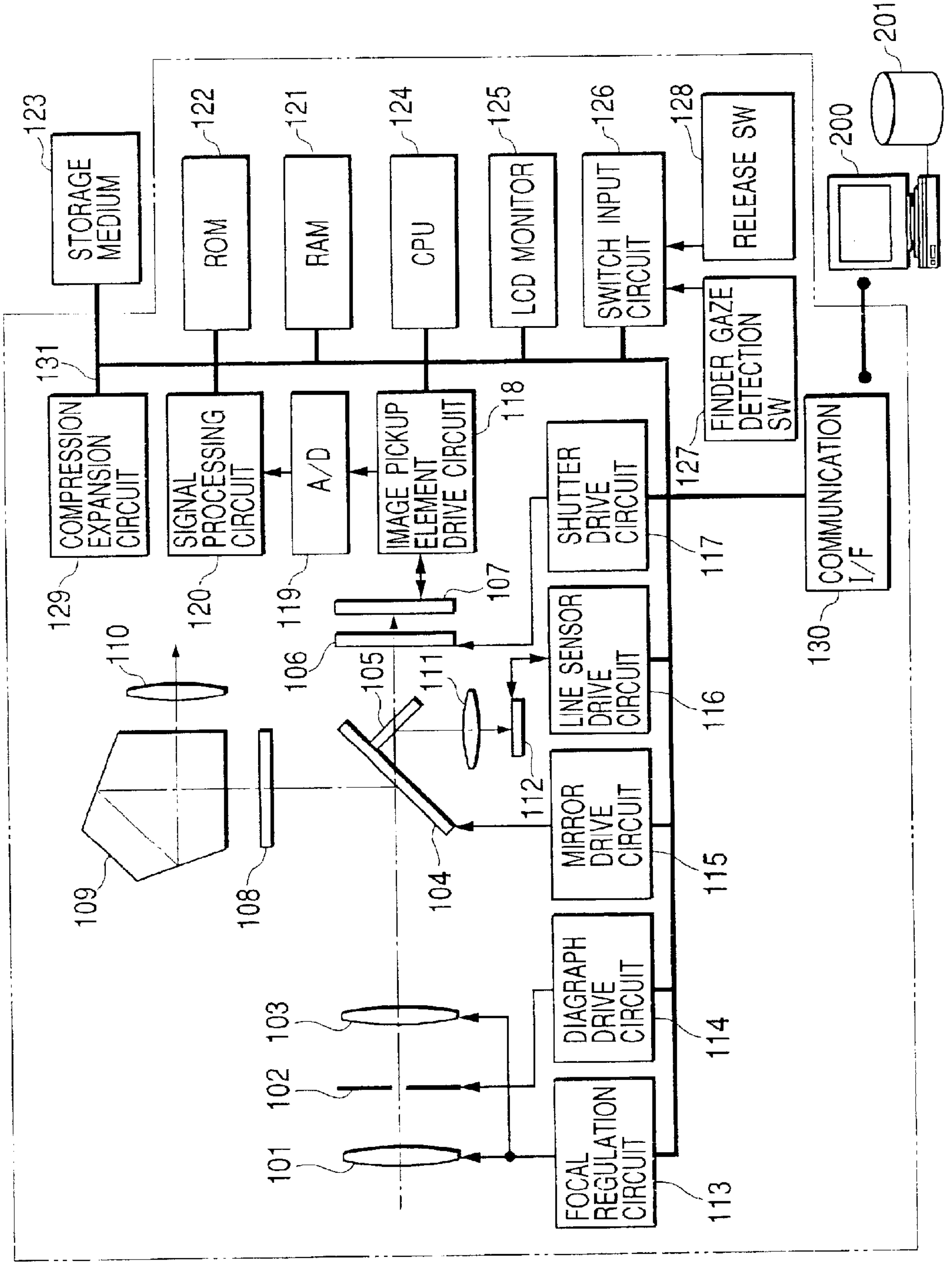
FIG. 1 is a diagram showing the overall configuration of an image pickup apparatus, an external device and an image pickup system in accordance with an embodiment of the present invention.

FIG. 1 is a diagram showing the overall configuration of an image pickup apparatus, an external device and an image pickup system in accordance with an embodiment of the present invention.

The image pickup system in this embodiment of the present invention is constituted, for example, of a single-lens reflex type of digital camera 100 (image pickup apparatus), and a computer 200 (external device) connected to the digital camera 100 through a detachable cable, wireless communication or the like.

The digital camera 100 shown in FIG. 1 has picture taking lenses 101 and 103, a diaphragm 102 for adjusting the quantity of light from the picture taking lenses, a main mirror 104 for causing a light beam passing through the picture taking lens 103 and forming a subject image to enter the picture taking optical path or deviate from the same in correspondence with a state in which the subject image is observed through a finder system or a state in which the subject image is photographed, a sub mirror 105 for reflecting a light beam passing through the main mirror 104 toward a lens system 111 and a line sensor 112 provided for detection of a focal point and positioned below a camera body, an image pickup element 107 formed of a charge-coupled device (CCD), a complementary metal-oxide semiconductor (CMOS) type or the like, an in-finder liquid crystal display (LCD) (transmission-type LCD) 108 for displaying a mark representing a focus plate placed at a predetermined imaging plane of the picture taking lenses 101 and 103, a distance measuring frame mark, etc., a penta prism 109 for changing a finder optical path, and an imaging lens 110. In actuality, the lens group, illustrated as two picture taking lenses 101 and 103 for convenience sake, is constituted of a larger number of lenses.

The digital camera 100 also has a focusing circuit 113 for focusing the picture taking lenses 101 and 103, a diaphragm drive circuit 114 for driving the diaphragm placed between the picture taking lenses 101 and 103, a mirror drive circuit 115 for driving the main mirror 104, a line sensor drive circuit 116 for driving the line sensor 112, a shutter drive circuit 117 for driving a shutter 106, an image pickup element drive circuit 118 for driving the image pickup element 107, an analog to digital (A/D) converter 119 for making A/D conversion of an analog photography signal output from the image pickup element 107, a signal processing circuit 120 for performing signal processing on a converted digital photography signal from the A/D converter 119, and a compression expansion circuit 129 for compressing the digital image signal processed by the signal processing circuit 120 and for decompressing a compressed digital image signal.

The digital camera 100 further has a random access memory (RAM) 121 for temporarily storing a digital image signal, etc., and for providing an area for execution of a program, a read only memory (ROM) 122 on which programs, etc., are stored, a central processing unit (CPU) 124 of a microcomputer, an LCD monitor 125 for displaying a digital image signal representing a photographed image, a release switch (SW) 128, a finder gaze detection SW 127 for determining whether a user is viewing a scene through the finder, a switch input circuit 126 for recognizing the states of the release switch 128, the finder gaze detection SW 127, a switch dial such as a mode dial for changing from one photography mode to another, etc., and a communication interface 130 in accordance with the universal serial bus (USB) specifications or the RS232C specifications.

The communication interface 130 is connected to the computer 200 having a storage medium 201 such as a hard disk. The communication interface 130 is used when a digital image signal is transferred from the digital camera 100 to the computer 200, when a command is transmitted from the computer 200 to the digital camera 100, or when the computer 200 is notified of the state of the digital camera 100. The communication interface 130 used in this embodiment is configured in accordance with the USB specifications.

The release switch 128 is a switch having at least two contacts and has such a structure as to change in state two steps according to the amount by which it is depressed. When it is depressed to an intermediate position, the first contact (hereinafter referred to as SW1) is selected. When it is depressed to the lowest position, the second contact (hereinafter referred to as SW2) is selected. When SW1 is selected, a photography preparation operation such as automatic focusing (AF) or autoexposure (AE) is performed. When SW2 is selected, a picture taking operation and operations for generating and recording digital image data are performed.

Excepting the A/D converter 119, the finder gaze detection SW 127 and the release switch 128, the components (113 to 118, 120 to 126, and 129) are connected to each other through a bus 131.

The digital camera 100 records obtained digital signals at a final stage and is therefore arranged so that a storage medium 123, e.g., a CompactFlash memory (corresponding to "image saving memory" in the claims) can be connected to the bus 131.

The computer 200 has an image transfer possible state flag PC_TR_STATE indicating a state in which a digital image signal can be transferred from the digital camera 100 or a state in which no digital image signal can be transferred from the digital camera 100, a photography image queue in which the value of an image INDEX transferred from the digital camera 100 is held, a transmitting section (not shown) for transmitting each of PC events to the digital camera 100, a receiving section (not shown) for receiving each of camera events, and a CPU (not shown) for overall control of the computer 200.

The picture taking operation of the digital camera 100 arranged as described above will be described.

When a photographer selects SW1, AF and AE operations are performed in the digital camera 100. When the user next selects SW2 while the camera is in this state, the diaphragm 102 is adjusted, the light beam from the picture taking lens 103 is caused to travel toward the image pickup element by making the main mirror 104 recede, and the shutter 106 is opened, left open for a certain time period, and closed. During this time period, a subject is imaged on the image pickup element 107 to form a subject image. This subject image is converted by photoelectric conversion into a photography signal to be output from the image pickup element 107. The output signal undergoes A/D conversion in the A/D converter circuit 119 and signal processing in the signal processing circuit 120. A digital image signal thereby obtained is temporarily stored in the RAM 121. The digital image signal temporarily stored in the RAM 121 is processed by compression processing in the compression expansion circuit 129 to be saved as a file on the storage medium 123, e.g., a CompactFlash memory, thereby completing the picture taking operation. In parallel with the processing after closing of the shutter, returning of the main mirror 104 and opening of the diaphragm are performed.

Figure 2:
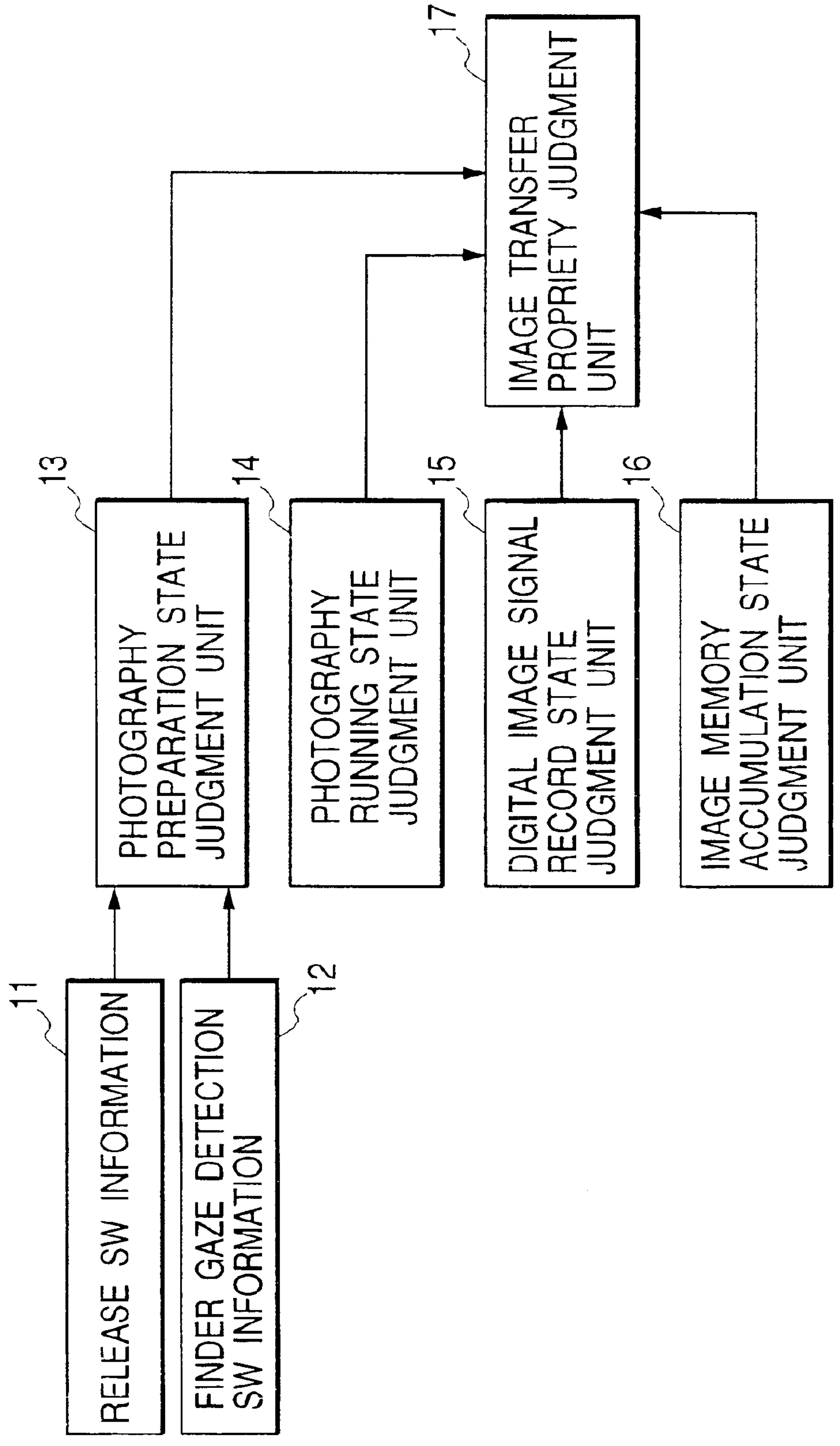
FIG. 2 is a block diagram showing the configuration of a program for making a judgment as to whether a digital image signal temporarily stored in a RAM 121 will be transferred to a computer 200.

FIG. 2 is a diagram showing the configuration of a program for judgment as to whether a digital image signal temporarily saved in the RAM 121 provided as a buffer memory is transferred to the computer 200.

This program is ordinarily provided in the CPU 124 shown in FIG. 1 and is constituted of release SW information 11 as to whether the user has pressed SW1 in release SW 128, finder gaze detection SW information obtained from the finder gaze detection SW 127 as information as to whether the user is viewing a scene through the finder, a photography preparation state judgment unit 13 for making on the basis of these sorts of information a judgment as to whether the digital camera 100 is in a state of preparing itself for picture taking or ready to perform picture taking, a photography running state judgment unit 14 for judgment as to whether the digital camera 100 is in a state of executing picture taking, a digital image signal record state judgment unit 15 for judgment as to whether a digital image signal representing a taken picture is recorded on the storage medium 123, an image memory accumulation state judgment unit 16 for judgment as to whether a new digital image signal can be accumulated in the RAM 121 of the digital camera 100, and an image transfer propriety judgment unit 17 for making a judgment as to whether a digital image signal accumulated in the RAM 121 will be transferred to the computer 200 on the basis of information from the photography preparation state judgment unit 13, the photography running state judgment unit 14, the digital image signal record state judgment unit 15, and the image memory accumulation state judgment unit 16.

Kinds of request and kinds of event transmitted and received between the digital camera 100 and the computer 200 through the communication interface 103 and the meanings of the kinds of request and the kinds of event will be described.

FIG. 3 is a diagram showing kinds of request transmitted from the computer 200 to the digital camera 100 and the meanings of the kinds of request.

The computer 200 transmits a request to the digital camera 100 by using control transfer (control out) in accordance with the USB specifications.

Referring to FIG. 3, a PC request "REQUEST_INIT" is for requesting the digital camera 100 to initialize a digital image signal transfer facility. A PC request "REQUEST_EXIT" is for requesting the digital camera 100 to stop use of the digital image signal transfer facility. A PC request "REQUEST_IMAGE_SIZE" is for requesting notification of the file size of a digital image signal representing a picture taken by the digital camera 100. This request includes designation of the digital image signal from which the file size will be obtained, which designation is performed by using image INDEX notified in notification of a camera event "EVENT_IMAGE_CAPTURED" from the digital camera 100. After transmission of this request, the computer 200 waits for file size information sent as a reply from the digital camera 100. File size information is data of a fixed length. For transmission of file size information to be obtained by the computer 200, bulk transfer (bulk in) in accordance with the USB specifications is used.

A PC request "REQUEST_TRANSFER_IMAGE" is for requesting the digital camera 100 to transfer to the computer 200 a digital image signal representing a picture taken by the digital camera 100. This request includes designation of the digital image signal to be transferred, which designation is performed by using image INDEX notified in notification of the camera event "EVENT_IMAGE_CAPTURED" from the digital camera 100. After transmission of this request, the computer 200 waits for transfer of the amount of data of the digital image signal corresponding to the file size obtained by PC request "REQUEST_IMAGE_SIZE" from the digital camera 100. Bulk transfer (bulk in) in accordance with the USB specifications is used for transfer of the digital image signal.

A PC request "REQUEST_CLEAR_IMAGE" is for requesting the digital camera 100 to delete the transferred digital image signal from the RAM 121. This request includes designation of the digital image signal to be deleted, which designation is performed by using image INDEX notified in notification of the camera event "EVENT_IMAGE_CAPTURED" from the digital camera 100.

FIG. 4 is a diagram showing kinds of camera event transmitted from the digital camera 100 to the computer 200 and the meanings of the kinds of camera event.

A camera event is transmitted by using interrupt transfer (interrupt in) in accordance with the USB specifications. Interrupt transfer is a communication method executed in such a manner that the digital camera 100 transmits data in response to a transfer request periodically sent from the computer 200. Even during execution of a different kind of transfer such as bulk transfer, interrupt transfer is performed in parallel therewith. Therefore, the digital camera 100 can notify the computer 200 of a transferable state or a non-transferable state even when a digital image signal is being transferred from the digital camera 100 to the computer 200.

Referring to FIG. 4, a camera event "EVENT_IMAGE_CAPTURED" is transmitted from the camera 100 to the computer 200 to notify the same that a new digital image signal has been produced by picture taking in the digital camera 100. At this time, the computer 200 is simultaneously notified of image INDEX for discrimination on the RAM 121 of the digital image signal produced by picture taking. A camera event "EVENT_TRANSFER_ENABLE" is transmitted from the camera 100 to the computer 200 to notify the same of a state in which transfer of the digital image signal is enabled according to a judgment made by the image transfer propriety judgment unit of the digital camera 100. A camera event "EVENT_TRANSFER_DISABLE" is transmitted from the camera 100 to the computer 200 to notify the same of a state in which transfer of the digital image signal is disabled according to a judgment made by the image transfer propriety judgment unit.

Figure 5:
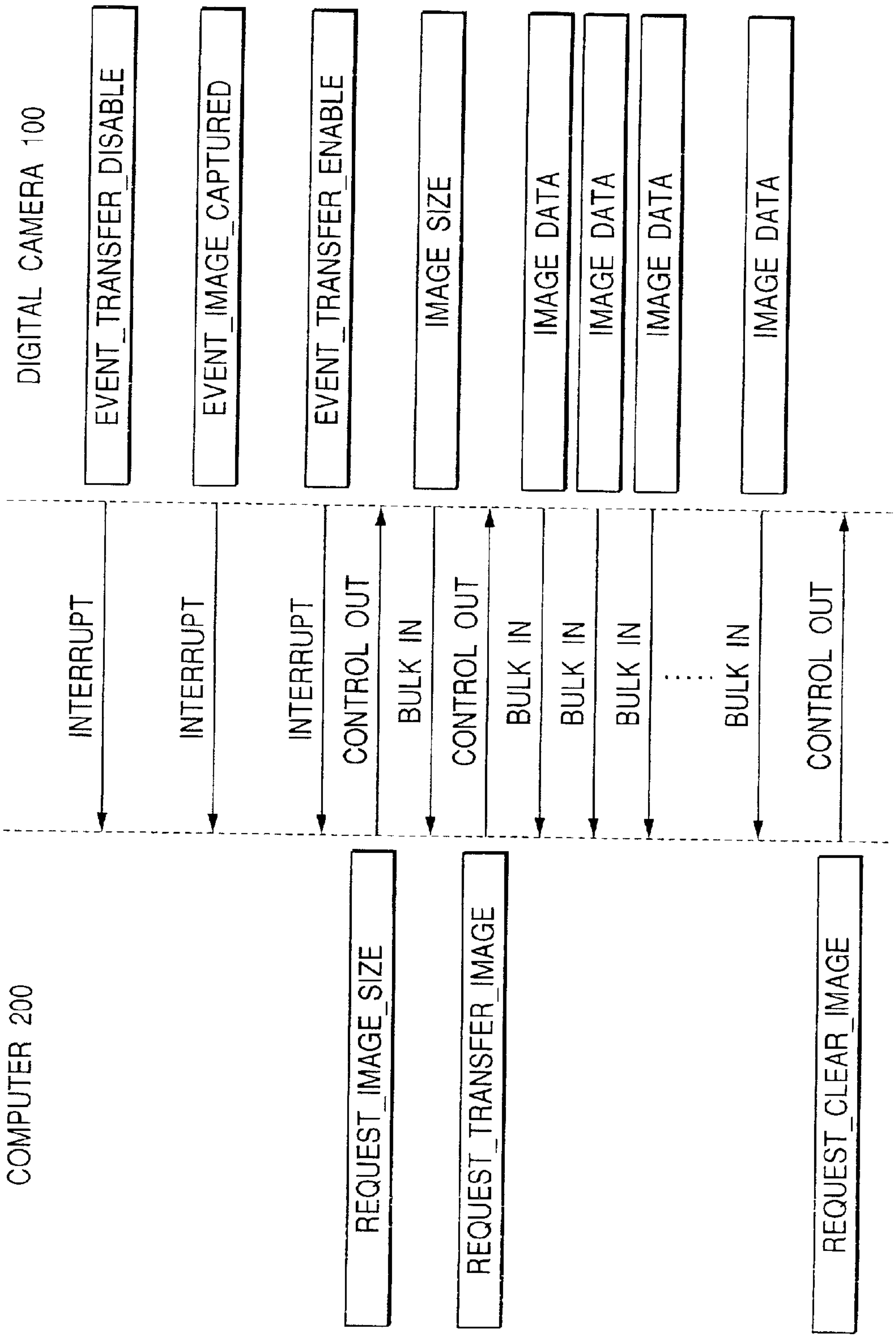
FIG. 5 is a diagram showing, with respect to time, communication operations between a time when a digital image photographed by the digital camera 100 to a time when the digital image signal representing the photographed image is transferred to the computer 200.

FIG. 5 is a diagram showing, with respect to time, communication operations performed during the time period from a time when a digital image photographed by the digital camera 100 to a time when the digital image signal representing the photographed image is transferred to the computer 200.

Before the digital camera 100 photographs to produce a digital image, it transmits camera event "EVENT_

TRANSFER_DISABLE" to the computer 200 to inhibit the operation for transfer of a digital image signal.

Next, when the digital camera 100 photographs to obtain a digital image, it transmits camera event "EVENT_IMAGE_CAPTURED" to the computer 200.

After finishing the picture taking operation, the digital camera 100 transmits camera event "EVENT_TRANSFER_ENABLE" to the computer 200 to allow the operation for transfer of the digital image signal. The digital camera 100 transmits these camera events by using interrupt transfer in accordance with the USB specifications.

The computer 200 then transmits PC request "REQUEST_IMAGE_SIZE" by using control transfer to request notification of the file size of the digital image signal representing the image photographed by the digital camera 100. In response to this request, the digital camera 100 transfers the digital image signal to the computer 200 by using bulk transfer.

Next, the computer 200 transmits PC request "REQUEST_TRANSFER_IMAGE" by using control transfer to request the digital image signal representing the image photographed by the digital camera 100 to be transferred to the computer 200. In response to this request, the digital camera 100 transfers the digital image signal to the computer 200 by using bulk transfer. When transfer of the amount of data corresponding to the file size obtained from the digital camera 100 by PC request "REQUEST_IMAGE_SIZE" is completed, the computer 200 determines that one digital image signal has been transferred.

Finally, the computer 200 transmits PC request "REQUEST_CLEAR_IMAGE" by using control transfer to request elimination of the digital image signal from the RAM 121 of the digital camera 100 after the completion of transfer of the digital image signal.

FIG. 6 is a diagram showing results of judgments made by the image transfer propriety judgment unit 17 with respect to output information from the photography preparation state judgment unit 13, the photography running state judgment unit 14, the digital image signal record state judgment unit 15, and the image memory accumulation state judgment unit 16.

The digital camera 100 saves data on each image to the storage medium 123 before transfer to the computer 200. Therefore, if the RAM 121 contains no image already saved to the storage medium 123, the digital camera 100 transfers to the computer 200 no digital image signal accumulated in the RAM 121. That is, in such a situation, the image transfer propriety state (CAM_TR_STATE) is "False" (corresponding to cases 1, 2, 5, and 6 shown in FIG. 6).

In a case where the digital camera 100 is not in the photography preparation state or the photography execution state, and where the RAM 121 contains some image already saved to the storage medium 123, the digital camera 100 transfers to the computer 200 the digital image signal accumulated in the RAM 121 regardless of whether a new digital image signal can be accumulated in the RAM 121, i.e., whether the RAM 121 is full. That is, in this case, the image transfer propriety state is "True" (corresponding to cases 3 and 4 shown in FIG. 6).

In a case where the digital camera 100 is in the photography preparation state or the photography execution state, where the RAM 121 contains some image already saved to the storage medium 123, and where the RAM 121 is not full and a new digital image signal can be accumulated in the RAM 121, the digital camera 100 does not transfer to the computer 200 the digital image signal accumulated in the RAM 121. That is, in this case, the image transfer propriety state is False (corresponding to a case 7 shown in FIG. 6). If the RAM 121 is full and any new digital image signal cannot be accumulated in the RAM 121, then the digital camera 100 transfers to the computer 200 the digital image signal accumulated in the RAM 121. That is, in this case, the image transfer propriety state is True (corresponding to a case 8 shown in FIG. 6).

Figure 7:
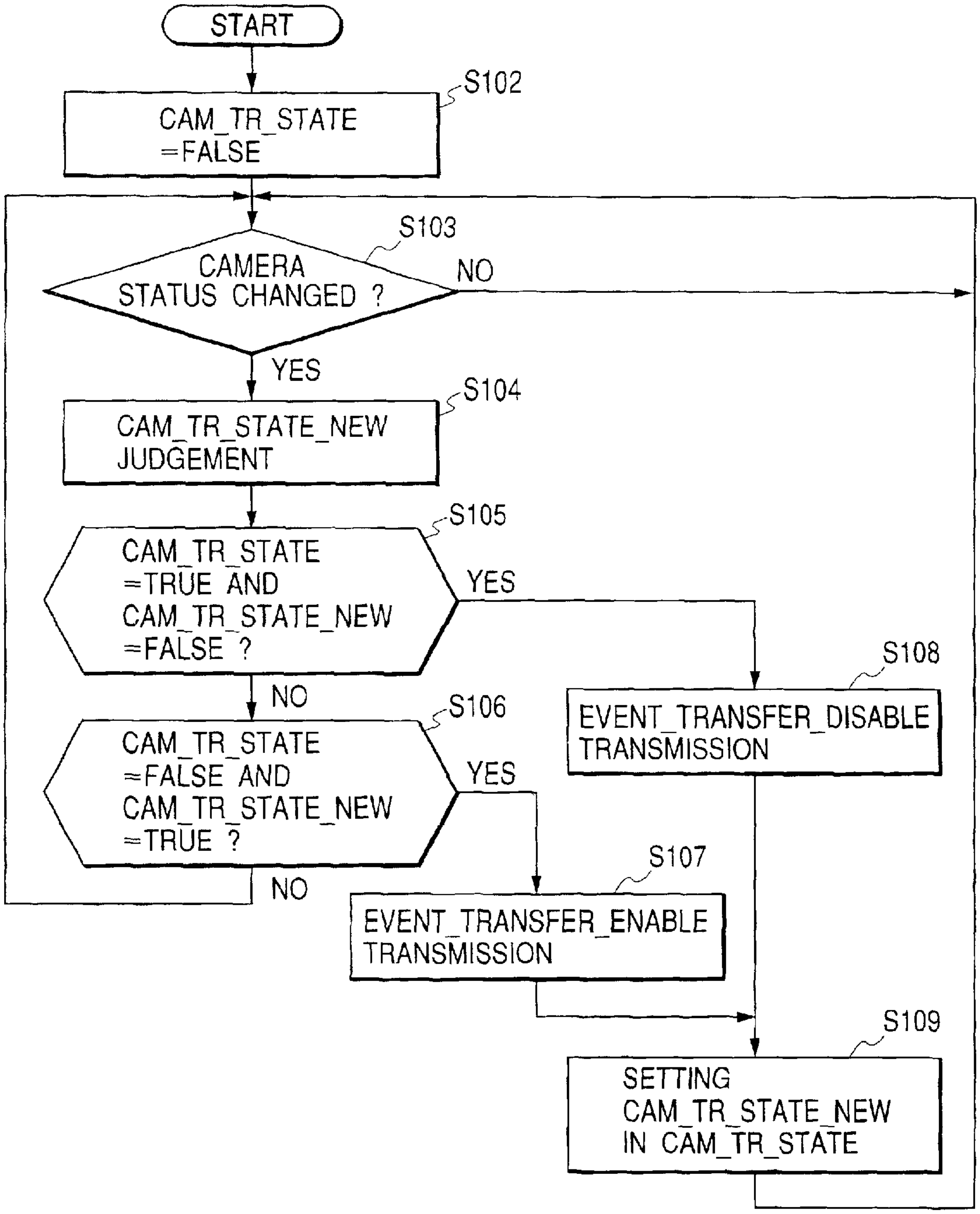
FIG. 7 is a flowchart showing the operation of the digital camera 100 transmitting camera event "EVENT_TRANSFER_ENABLE" and camera event "EVENT_TRANSFER_DISABLE"

FIG. 7 is a flowchart showing the operation of the digital camera 100 transmitting camera event "EVENT_TRANSFER_ENABLE" and camera event "EVENT_TRANSFER_DISABLE".

First, the digital camera 100 sets the present image transfer propriety state to False (step S102) and makes a judgment as to whether a change has occurred in its state (step S103). More specifically, the digital camera 100 makes a judgment as to whether a change has occurred in its state according to whether a change has occurred in the photography preparation state in the digital camera 100, whether a change has occurred in the photography execution state, whether a change has occurred in the image signal record state, or whether a change has occurred in the image memory accumulation state.

If the result of judgment in step S103 is that no change has occurred in the state of the digital camera 100, the digital camera 100 repeats judgment in step S103. If a change has occurred in the state of the digital camera 100, the digital camera 100 makes a judgment as to the image transfer propriety state (CAM_TR_STATE_NEW) after the change in state according to the result of judgment made by the image transfer propriety state judgment unit 17 with respect to output information from the judgement units 13 to 16 shown in FIG. 6 (step S104).

Next, the digital camera 100 makes a judgment as to whether the image transfer propriety state (CAM_TR_STATE) before the change in state is True and whether the transfer propriety state (CAM_TR_STATE_NEW) after the change in state is False (step S105). If CAM_TR_STATE is true while CAM_TR_STATE_NEW is False, the digital camera 100 transmits camera event "EVENT_TRANSFER_DISABLE" in order not to transfer any digital image signal to the computer 200 (step S108).

In cases other than the case where CAM_TR_STATE is True and CAM_TR_STATE_NEW is False, the digital camera 100 makes a judgment as to whether the image transfer propriety state (CAM_TR_STATE) before the change in state is False and whether the transfer propriety state (CAM_TR_STATE_NEW) after the change in state is True (step S106).

If the result of judgment in step S106 is that CAM_TR_STATE is False while CAM_TR_STATE_NEW is True, the digital camera 100 transmits camera event "EVENT_TRANSFER_ENABLE" in order to transfer the digital image signal to the computer 200 (step S107). In cases other than the case where CAM_TR_STATE is False and CAM_TR_STATE_NEW is True, the process returns to step S103.

After steps 107 and 108, the digital camera 100 updates the present image transfer propriety state by replacing the value of CAM_TR_STATE with the value of CAM_TR_STATE_NEW (step S109). The process then returns to step S103 and the digital camera 100 again checks whether a change has occurred in its state.

Figure 8:
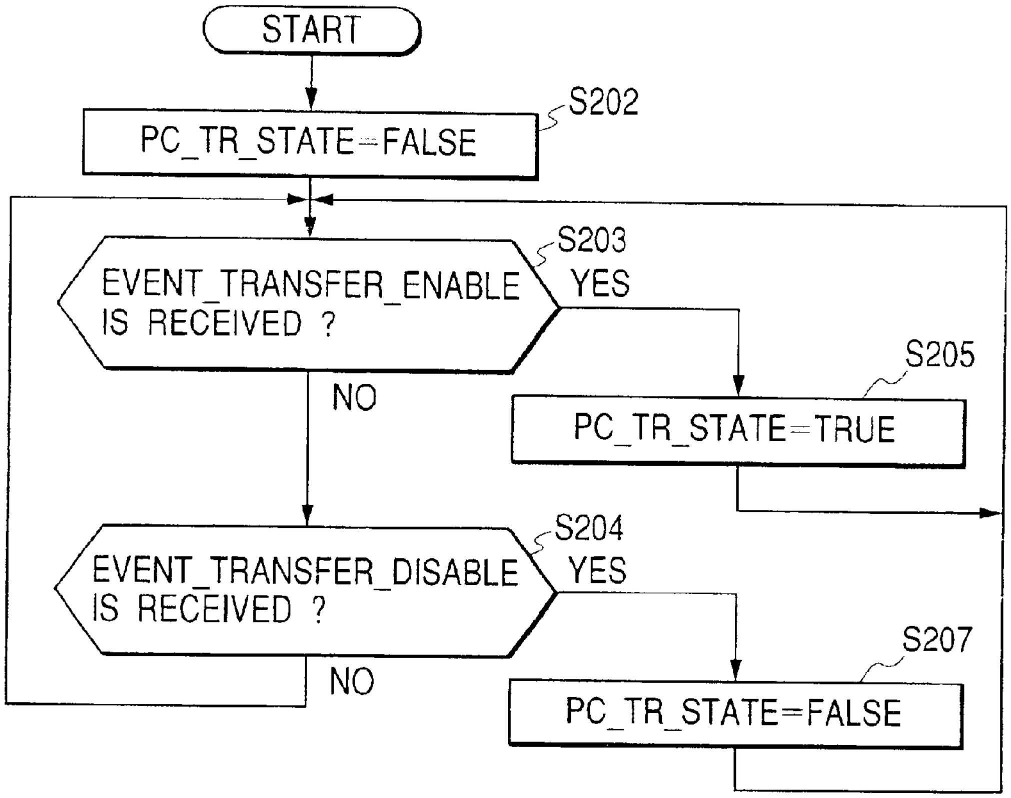
FIG. 8 is a flowchart showing the operation of the computer 200 receiving camera event "EVENT_TRANSFER_ENABLE" and camera event "EVENT_TRANSFER_DISABLE" from the digital camera 100 and updating an image transfer possible state flag (PC_TR_STATE) in the computer 200.

FIG. 8 is a flowchart showing the operation of the computer 200 receiving camera event "EVENT_TRANSFER_ENABLE" and camera event "EVENT_

TRANSFER_DISABLE" and updating the image transfer possible state flag (PC_TR_STATE) therein.

First, the computer 200 sets the present image transfer possible state flag (PC_TR_STATE) to False to recognize the image non-transferable state (step S202) and makes a judgment as to whether camera event "EVENT_TRANSFER_ENABLE" has been received from the digital camera 100 (step S203).

If the result of step S203 is that camera event "EVENT_TRANSFER_ENABLE" has been received, the computer 200 updates PC_TR_STATE to True (step S205) and the process then returns to step S203. If camera event "EVENT_TRANSFER_ENABLE" has not been received, the computer 200 makes a judgment as to whether camera event "EVENT_TRANSFER_DISABLE" has been received (step S204).

If the result of step S204 is that camera event "EVENT_TRANSFER_DISABLE" has been received, the computer 200 updates PC_TR_STATE to False (step S207) and the process returns to step S203. If camera event "EVENT_TRANSFER_DISABLE" has not been received, the process returns directly to step S203.

Figure 9:
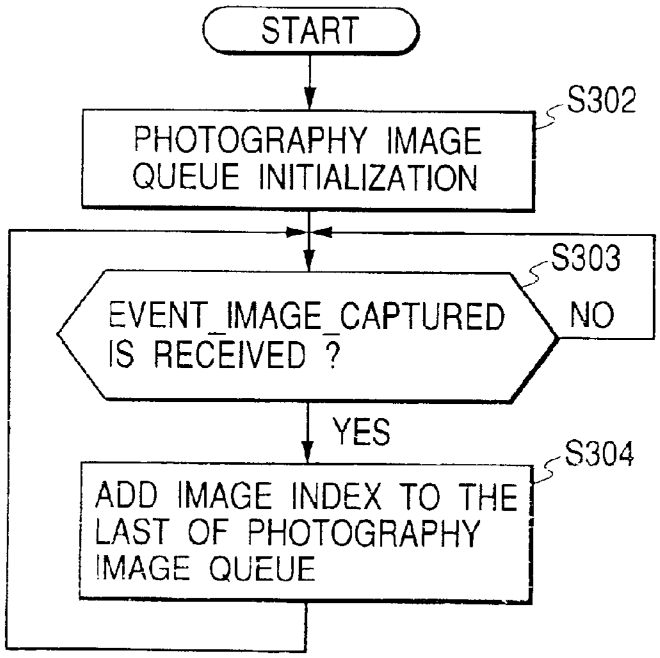
FIG. 9 is a flowchart showing the operation of the computer 200 temporarily accumulating, in photography image queue held therein, the value of image INDEX obtained along with each reception of camera event "EVENT_IMAGE_CAPTURED" from the digital camera 100.

FIG. 9 shows the operation of the computer 200 temporarily accumulating, in the photography image queue held therein, the value of image INDEX obtained along with camera event "EVENT_IMAGE_CAPTURED" each time camera event "EVENT_IMAGE_CAPTURED" is received from the digital camera 100.

First, the computer 200 initializes the photography image queue (step S302) and makes a judgment as to whether camera event "EVENT_IMAGE_CAPTURED" has been received from the digital camera 100 (step S303). If camera event "EVENT_IMAGE_CAPTURED" has not been received, the computer 200 repeats this judgment. If camera event "EVENT_IMAGE_CAPTURED" has been received, the computer 200 adds the value of image INDEX simultaneously obtained to the end of the photography image queue (step S304). Finally, the process returns to step S303 and the computer 200 again makes a judgment as to event receiving.

Figure 10:
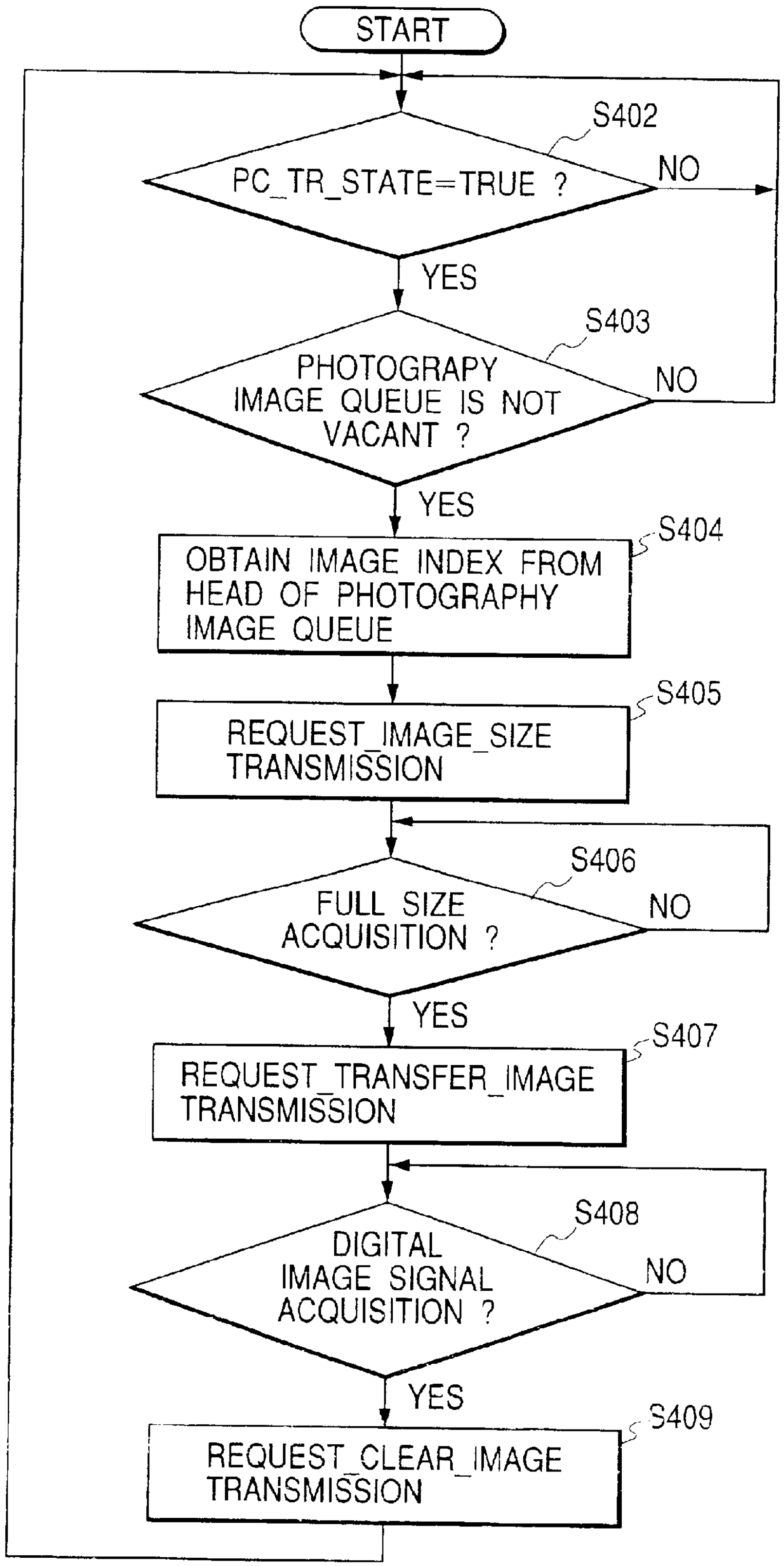
FIG. 10 is a flowchart showing the operation of the computer 200 receiving a digital image signal produced by picture taking with the digital camera 100.

FIG. 10 is a flowchart showing the operation of the computer 200 receiving a digital image signal produced by picture taking with the digital camera 100.

First, the computer 200 checks the image transfer possible state flag (PC_TR_STATE) updated in the operation shown in the flowchart of FIG. 8 to make judgment as to whether PC_TR_STATE is True (step S402). If PC_TR_STATE is False, the computer 200 repeats this judgment. If PC_TR_STATE is True, the computer 200 checks the photography image queue updated in the operation shown in the flowchart of FIG. 9 to make a judgment as to whether the photography image queue is empty (step S403). If the photography image queue is empty, the process returns to step S403. If the photography image queue is not empty, the computer 200 determines that a digital image signal to be received exists, obtains image INDEX from the top of the photography image queue (step S404), and transmits PC request "REQUEST_IMAGE_SIZE" to the digital camera 100 by using the image INDEX (step S405).

Next, the computer 200 waits for a state in which the file size can be obtained from the digital camera 100. When the file size is obtained (in the case of YES in step S406), the computer 200 transmits PC request "REQUEST_TRANSFER_IMAGE" to the digital camera 100 (step S407).

Next, the computer 200 waits for transfer of the digital image signal from the digital camera 100. That is, the computer 200 repeats judgment as to whether the digital image signal is obtained until acquisition of the digital image signal is achieved (step S408). In this judgment, the computer 200 determines that one digital image signal is transferred when transfer of the amount of data corresponding to the file size obtained from the digital camera 100 by PC request "REQUEST_IMAGE_SIZE" is completed.

Finally, the computer 200 transmits PC request "REQUEST_CLEAR_IMAGE" to the digital camera 100 for deletion from the RAM 121 of the digital camera 100 of the transferred digital image signal. The process then returns to step S402. This deletion processing includes enabling overwriting of data as well as erasing data.

In this embodiment, as described above, in a case where an image already saved to the storage medium 123 exists in the RAM 121 while the digital camera 100 is in the photography preparation state or in the photography execution state, and where the RAM 121 is full and any new digital image signal cannot be accumulated in the RAM 121, the digital camera 100 transfers to the computer 200 the digital image signal accumulated in the RAM 121. Thus, even if the user does not cancel the photography preparation instruction of the picture taking instruction, the operation for transferring a digital image signal can be automatically started to provide an open storage capacity necessary for the next picture taking in the RAM 121.

On the other hand, even in a case where the RAM 121 is full and any new digital image signal cannot be accumulated in the RAM 121 while the digital camera 100 is in the photography preparation state or in the photography execution state, the digital camera 100 does not transmit camera event "EVENT_TRANSFER_ENABLE" to the computer 200 and transmits none of digital image signals accumulated in the RAM 121 to the computer 200 if none of the digital image signals in the RAM 121 has been saved to the storage medium 123, because the digital camera 100 performs saving of each digital image signal to the storage medium 123 before transfer to the computer 200. Thus, the risk of some of digital image signals obtained by picture taking being lost by some failure during communication is reduced.

In the above-described arrangement, the image signal record state judgment unit 15 makes a judgment as to whether some digital image signal already saved to the storage medium 123 exists in the RAM 121, as shown in FIG. 6. Alternatively, the image signal record state judgment unit 15 makes a judgment as to whether all digital image signals stored in the RAM 121 have been saved to the storage medium 123, as shown in FIG. 11.

In such a case, if only one of the digital image signals in the RAM 121 has not been saved to the storage medium 123, none of the digital signals stored in the RAM 121 is transferred to the computer 200, because saving of all the digital image signals in the RAM 121 to the storage medium 123 is performed before image transfer to the computer 200.

In this manner, the risk of some of digital image signals obtained by picture taking being lost by some failure can be further reduced in comparison with the arrangement relating to FIG. 6.

The image pickup system of this embodiment is constituted chiefly of the single-lens reflex type of digital camera 100, and the computer 200 connected to the digital camera 100 through a detachable cable, wireless communication or the like. The image pickup system may alternatively be arranged such that the digital camera 100 and the computer 200 are combined integrally with each other and the digital camera 100 cannot be detached from the computer 200.

<Other Embodiments>

In the above-described arrangement, after image data has been saved to the storage medium 123, and after the image data has been transferred to the external device, the image data accumulated in the RAM 121 provided as a buffer memory is erased or overwriting of the image data is allowed to open the storage area of the RAM 121.

However, a method of erasing image data recorded on the storage medium 123 or allowing overwriting of the image data after transfer of the image data to the external device in addition to opening the storage area of the RAM 121 may alternatively be used effectively.

That is, only storage of image data has been described with respect to the storage medium 123 in the above-described embodiment but there is also a possibility of a deficiency of the usable storage area in the storage medium. In such a case, image data stored in the RAM 121 provided as a buffer memory is erased or overwriting of the image data is allowed after saving of the image data to the storage medium 123 and after transfer of the image data to the external device, and the image data recorded on the storage medium 123 and transferred to the external device is also erased or overwriting of the image data is allowed, thereby opening the storage area of the storage medium 123 without a need for any complicated process while ensuring the desired reliability of image data saving.

To enable this saving or overwriting, a unit (memory management unit) (not shown) for recognition of the usable remaining capacity of the storage medium 123 is provided in the image pickup apparatus.

This unit performs management of the remaining capacity of the memory in parallel with image data transfer processing. When the remaining capacity becomes smaller than a predetermined storage capacity, switching is performed from the mode in which transferred image signals are saved only from the RAM 121 to open the storage area of the same to the mode in which transferred image signals are saved from both the RAM 121 and the storage medium 123 to open the storage areas. This arrangement is particularly advantageous in terms of operationality.

This method is effective in a case where the storage capacity of the storage medium 123 is not sufficiently large.

The above-described opening of the storage area is erasing image data or enabling overwriting.

A method for enabling a picture taking operation when image data is being transferred is taken into consideration.

In this method, if a picture taking operation is started during transfer of image data to the external device after saving of the image data to the storage medium 123 as in the above-described embodiment, images accumulated in the RAM 121 are deleted to permit the picture taking operation, and image data newly obtained by picture taking is accumulated in the RAM 121.

The image data newly obtained is transferred to the external device, as in the above-described embodiment. Then the image data deleted before the completion of transfer as described above is read out from the storage medium 123 to be transferred in a continuation from the interrupted transfer. This process can be used advantageously.

Thus, picture taking can be performed when required, and the risk of some of digital image signals obtained by picture taking being lost by some failure during communication can be reduced.

As described above in detail, the image transfer propriety judgment means determines that a digital image signal obtained by picture taking and accumulated in the image memory means and corresponding to a digital image signal saved to the storage medium will be transferred to the external device if the photography preparation state judgment means determines that the image pickup apparatus is in the photography preparation state or the photography running state judgment means determines that the image pickup apparatus is in the photography execution state, if the digital image signal record state judgment means determines that the digital image signal obtained by picture taking has been stored to the storage medium, and if the image memory accumulation state judgment means determines that any new digital image signal cannot be accumulated in the image memory means. In this manner, the operation for transferring the digital image signal can be automatically performed without requiring a user to cancel a photography preparation instruction or a picture taking instruction when the image memory means becomes full. Thus, an open storage capacity necessary for the next picture taking can be provided in the image memory means.

Also, the image transfer propriety judgment means determines that a digital image signal accumulated in the image memory means and corresponding to a digital image signal judged by the digital image signal record state judgment means to have not been saved to the storage medium will not be transferred to the external device. Thus, saving of the digital image signal to the storage medium is performed before transfer to the external device. As a result, the risk of some of digital image signals obtained by picture taking being lost by some failure during communication is reduced.

Also, the image transfer propriety judgment means determines that a digital image signal accumulated in the image memory means and corresponding to a digital image signal judged by the digital image signal record state judgment means to have been saved to the storage will be transferred to the external device. Thus, saving of the digital image signal to the storage medium is performed before transfer to the external device, and the risk of some of digital image signals obtained by picture taking being lost by some failure during communication is reduced.

Also, the image transfer propriety judgment means determines that none of digital image signals accumulated in the image memory means will be transferred to the external device if the digital image signal record state judgment means determines that at least one of the digital image signals accumulated in the image memory means has not been saved to the storage medium, thereby further reducing the risk of some of digital image signals obtained by picture taking being lost by some failure during communication.

Also, interrupt processing in accordance with the USB specifications is also utilized to enable the image pickup apparatus to always notify the external device of a transfer possible state or a transfer impossible state even during picture taking or transfer of a digital image signal from the image pickup apparatus to the external device.

Also, in the external device connected to the image pickup apparatus, a transfer request signal is transmitted to the image pickup apparatus or the transmission is stopped according to a transfer possible state notice signal or a transfer impossible state notice signal transmitted from the image pickup apparatus to the external device.

Also, images are transferred to the external device when the buffer becomes full, provided that saving of the images accumulated in the buffer to the storage medium such as a memory card is performed with priority. Thus, the storage area of the image memory is made open while the reducing the risk of some of digital image signals obtained by picture taking being lost by some failure during communication.

Also, digital image data accumulated in the buffer is erased or overwriting of the data is enabled after transfer of the data to the external device to open the necessary storage area for newly recording image data.

The present invention is not limited to the above-described embodiments and various changes and modifications of the described embodiments can be made with in the scope of the invention as set forth in the appended claims.

What is claimed is:

1. An image pickup apparatus which records a digital image signal by taking a picture of an object and which transfers the recorded digital image signal to an external device, said apparatus comprising:

a buffer memory for temporarily accumulating the digital image signal obtained by picture taking;

an image saving memory for saving the digital image signal;

digital image signal record state judgment means for judging whether the digital image signal obtained by picture taking has been recorded in said image saving memory;

image memory accumulation state judgment means for judging whether a new digital image signal can be accumulated in said buffer memory; and transfer means for transferring to the external device the digital image signal accumulated in said buffer memory and corresponding to the digital image signal recorded in said image saving memory if said digital image signal record state judgment means determines that the digital image signal obtained by picture taking has been recorded in said image saving memory, and if said image memory accumulation state judgment means determines that any new digital image signal cannot be accumulated in said buffer memory.

2. An apparatus according to claim 1, wherein said buffer memory is controlled so that the accumulated digital image signal is erased or can be overwritten after transfer of the digital image signal by said transfer means.

3. An apparatus according to claim 2, further comprising a memory management unit for recognizing the usable remaining capacity of said image saving memory, wherein if said memory management unit recognizes that the remaining capacity has become smaller than a predetermined storage capacity, switching is performed from a mode in which the digital image signal transferred by said transfer means is erased from said buffer memory or overwriting of the signal is enabled to a mode in which the digital image signal transferred by said transfer means is erased from both said buffer memory and said image saving memory or overwriting of the signal is enabled in both said buffer memory and said image saving memory.

4. A method of controlling an image pickup apparatus which records a digital image signal by taking a picture of an object and which transfers the recorded digital image signal to an external device, said method comprising:

an accumulation step of temporarily accumulating in a buffer memory the digital image signal obtained by picture taking;

a recording step of finally saving the digital image signal to a memory;

a record state judgment step of judging whether the digital image signal obtained by picture taking has been recorded in said recording step;

an accumulation state judgment step of judging whether a new digital image signal can be accumulated in said accumulation step; and a transfer step of transferring to the external device the digital image signal accumulated in said buffer memory in said accumulation step and corresponding to the digital image signal recorded in said recording step if it is determined in said record state judgment step that the digital image signal obtained by picture taking has been recorded in said recording step, and if it is determined in said accumulation state judgment step that any new digital image signal cannot be accumulated in said buffer memory.

5. A method according to claim 4, wherein the memory to which the digital image signal is saved in said recording step comprises an image saving memory.

6. A method according to claim 4, wherein said buffer memory is controlled so that the accumulated digital image signal is erased or can be overwritten after transfer of the digital image signal in said transfer step.

7. A method according to claim 6, further comprising a memory management step of recognizing the usable remaining capacity of said image saving memory, wherein if it is recognized in said memory management step that the remaining capacity has become smaller than a predetermined storage capacity, switching is performed from a mode in which the digital image signal transferred in said transfer step is erased from said buffer memory or overwriting of the signal is enabled to a mode in which the digital image signal transferred in said transfer step is erased from both said buffer memory and said image saving memory or overwriting of the signal is enabled in both said buffer memory and said image saving memory.

8. An image pickup apparatus which records a digital image signal by taking a picture of an object and which transfers the recorded digital image signal to an external device, said apparatus comprising:

image memory means for temporarily storing the digital image signal obtained by picture taking;

detachable recording means for saving the digital image signal;

photography preparation state judgment means for judging whether said image pickup apparatus is in a photography preparation state;

photography running state judgment means for judging whether said image pickup apparatus is in a photography execution state;

digital image signal record state judgment means for judging whether the digital image signal obtained by picture taking has been recorded by said recording means;

image memory accumulation state judgment means for judging whether a new digital image signal can be accumulated in said image memory means; and image transfer propriety judgment means for judging whether the digital image signal accumulated in said image memory means will be transferred to the external device on the basis of output information from said photography preparation state judgment means, said photography running state judgment means, said digital image signal record state judgment means, and said image memory accumulation state judgment means, wherein said image transfer propriety judgment means determines that the digital image signal accumulated in said image memory means and corresponding to the digital image signal recorded by said recording means will be transferred to the external device if said photography preparation state judgment means determines that said image pickup apparatus is in the photography preparation state or said photography running state judgment means determines that said image pickup apparatus is in the photography execution state, if said digital image signal record state judgment means determines that the digital image signal obtained by picture taking has been recorded by said recording means, and if said image memory accumulation state judgment means determines that any new digital image signal cannot be accumulated in said image memory means.

9. An apparatus according to claim 8, wherein said image transfer propriety judgment means determines that the digital image signal accumulated in said image memory means will not be transferred to the external device if said photography preparation state judgment means determines that said image pickup apparatus is in the photography preparation state or said photography running state judgment means determines that said image pickup apparatus is in the photography execution state, and if said image memory accumulation state judgment means determines that a new digital image signal can be accumulated in said image memory means.

10. An apparatus according to claim 8, wherein said image transfer propriety judgment means determines that a digital image signal accumulated in said image memory means and corresponding to a digital image signal judged by said digital image signal record state judgment means, which has not been recorded by said recording means will not be transferred to the external device.

11. An apparatus according to claim 8, wherein said image transfer propriety judgment means determines that a digital image signal accumulated in said image memory means and corresponding to a digital image signal judged by said digital image signal record state judgment means, which has been recorded by said recording means will be transferred to the external device.

12. An apparatus according to claim 8, wherein said image transfer propriety judgment means determines that none of digital image signals accumulated in said image memory means will be transferred to the external device if said digital image signal record state judgment means determines that some of the digital image signals accumulated in said image memory means have not been recorded by said recording means.

13. An apparatus according to claim 8, further comprising a release switch having at least two contacts, wherein said photography preparation state judgment means determines that said image pickup apparatus is in the photography preparation state when the first contact of said release switch is selected.

14. An apparatus according to claim 8, further comprising a finder and detection means for detecting a state of a user viewing a scene through the finder, wherein said photography preparation state judgment means determines that said image pickup apparatus is in the photography preparation state on the basis of information from said detection means that a user is viewing a scene through the finder.

15. An apparatus according to claim 8, further comprising a state notice signal transmitting means for transmitting a transfer possible state notice signal to the external device if said image transfer propriety judgment means determines that the digital image signal accumulated in said image memory means can be transferred to the external device, and for transmitting a transfer impossible state notice signal to the external device if said image transfer propriety judgment means determines that the digital image signal accumulated in said image memory means cannot be transferred to the external device.

16. An apparatus according to claim 15, further comprising communication means for performing communication with the external device in accordance with the USB specifications, wherein said state notice signal transmitting means transmits the transfer possible state notice signal or the transfer impossible state notice signal to the external device by using an interrupt transfer function of said communication means in accordance with the USB specifications.

17. An external device connected to an image pickup apparatus which records a digital image signal by taking a picture of an object and which transfers the recorded digital image signal, said external device comprising:

state notice signal receiving means for receiving a transfer possible state notice signal transmitted to said external device when it is determined that a digital image signal accumulated in image memory means provided in said image pickup apparatus can be transferred to said external device, and for receiving a transfer impossible state notice signal transmitted to said external device when it is determined that a digital image signal accumulated in image memory means provided in said image pickup apparatus cannot be transferred to said external device; and transfer request signal transmitting means for transmitting a transfer request signal to said image pickup apparatus to request said image pickup apparatus to transfer the digital image signal accumulated in said image memory means, wherein said transfer request signal transmitting means transmits the transfer request signal to said image pickup apparatus when said state notice signal receiving means receives the transfer possible state notice signal, and said transfer request signal transmitting means does not transmit the transfer request signal to said image pickup apparatus when said state notice signal receiving means receives the transfer impossible state notice signal.

* * * * *

UNITED STATES PATENT AND TRADEMARK OFFICE

CERTIFICATE OF CORRECTION

PATENT NO. : 6,864,918 B2 
DATED : March 8, 2005
INVENTOR(S) : Yuji Koide

It is certified that error appears in the above-identified patent and that said Letters Patent is hereby corrected as shown below:

Drawings,
Sheet 1 of 10, Figure 1, "DIAGRAPH" should read -- DIAPHRAGM --.
Sheet 9 of 10, Figure 10, "PHOTOGRAPY" should read -- PHOTOGRAPHY --.
Sheet 10 of 10, Figure 11, "HAS BEEN" should read -- HAVE BEEN --.

Column 3,
Line 1, "FIG. 11" should read -- FIG. 11 is --.

Column 13,
Line 7, "with in" should read -- within --.

Signed and Sealed this

Second Day of August, 2005

JON W. DUDAS
*Director of the United States Patent and Trademark Office*